US00RE47795E

(19) United States
(12) Reissued Patent
Laitta et al.

(10) Patent Number: US RE47,795 E
(45) Date of Reissued Patent: Jan. 7, 2020

(54) HANDRAIL

(71) Applicant: S.R. Smith, LLC, Canby, OR (US)

(72) Inventors: Richard P. Laitta, Canby, OR (US); Darrin Johnson, Portland, TN (US)

(73) Assignee: S.R. SMITH, LLC, Canby, OR (US)

(21) Appl. No.: 29/626,577

(22) Filed: Nov. 17, 2017

Related U.S. Patent Documents

Reissue of:
(64) Patent No.: Des. 706,451
Issued: Jun. 3, 2014
Appl. No.: 29/462,252
Filed: Jul. 31, 2013

U.S. Applications:
(62) Division of application No. 29/515,597, filed on Jan. 23, 2015, which is an application for the reissue of Pat. No. Des. 706,451.

(51) LOC (12) Cl. ..... 25-02
(52) U.S. Cl.
USPC ..... D25/41.1
(58) Field of Classification Search
USPC ..... D25/38.1, 41.1, 43, 44, 119, 122, 124; D26/138, 155

(Continued)

(56) References Cited

U.S. PATENT DOCUMENTS

D194,835 S * 3/1963 Prizler et al. ..... D12/414
3,494,596 A * 2/1970 Bellinson ..... E04F 11/1851 256/24

(Continued)

OTHER PUBLICATIONS

Pool Jewels, Rail Goods, web page <http://pooljewels.com/railgoods.html>, 1 page, Dec. 19, 2011 retrieved from Internet Archive < https://web.archive.org/web/20091231145933/http://pooljewels.com/railgoods.html> on Feb. 4, 2015.

(Continued)

*Primary Examiner* — Darlington Ly
(74) *Attorney, Agent, or Firm* — Stoel Rives LLP

(57) CLAIM

We claim the ornamental design for a handrail, as shown and described.

DESCRIPTION

*This application is a divisional reissue of U.S. application Ser. No. 29/515,597 filed Jan. 23, 2015 which is a broadening reissue of U.S. Pat. No. D706,451 which issued Jun. 3, 2014 from application Ser. No. 29/462,252 filed Jul, 31, 2013.*

*This application is a broadening reissue of U.S. Pat. No. D706,451 which issued Jun. 3, 2014 from application Ser. No. 29/462,252 filed Jul. 31, 2013.*

*FIG. 7 is a perspective view of a handrail;*

*FIG. 8 is a front elevation view of the handrail of FIG. 7, the rear elevation view is a mirror image thereof;*

*FIG. 9 is a top plan view of the handrail of FIG. 7;*

*FIG. 10 is a bottom plan view of the handrail of FIG. 7;*

*FIG. 11 is a left side elevation view of the handrail of FIG. 7; and,*

*FIG. 12 is a right side elevation view of the handrail of FIG. 7.*

(Continued)

Figures 1, 2, 3, 4, 5, 6:
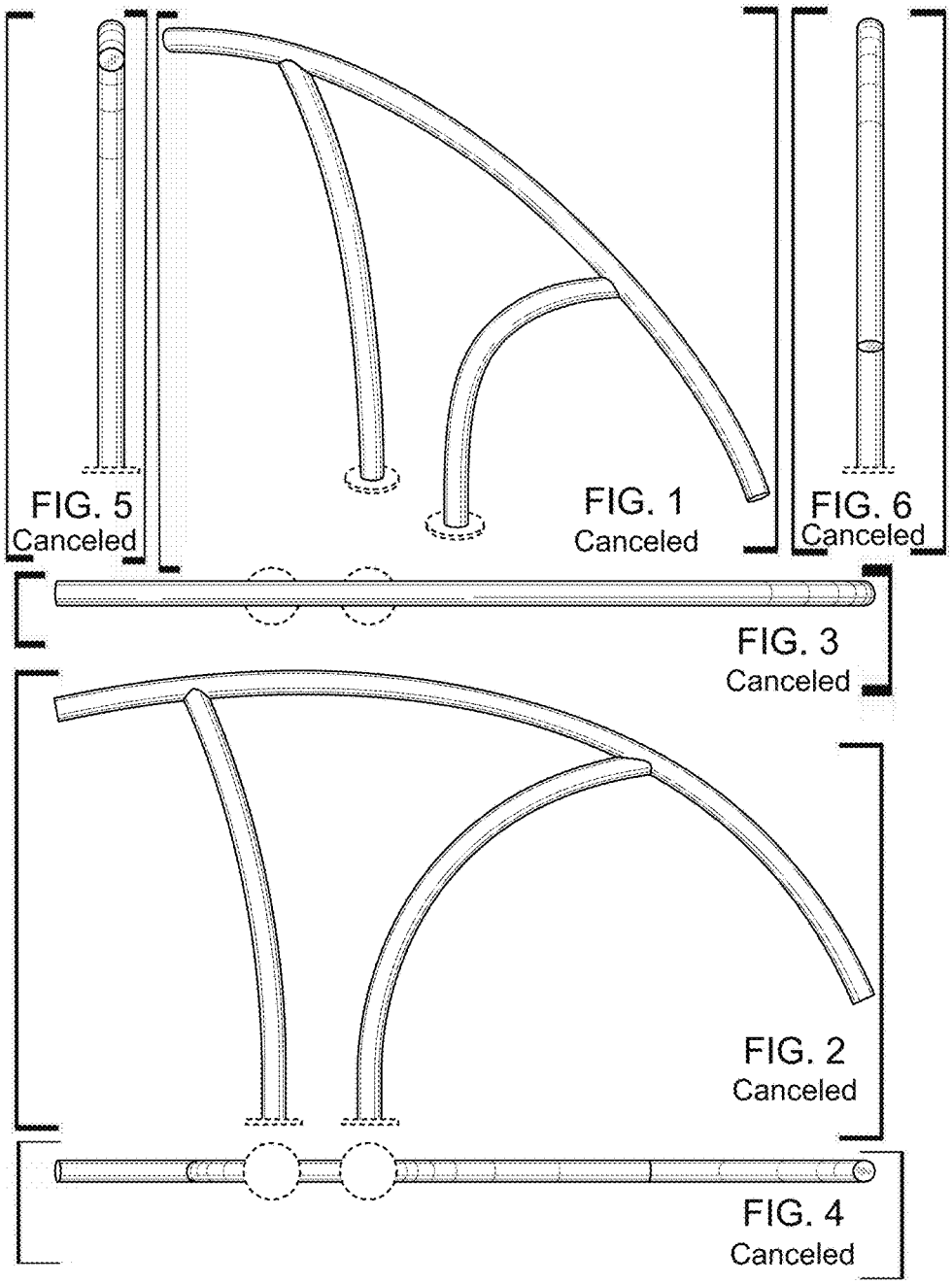
[FIG. 1 is a perspective view of a handrail.]
[FIG. 2 is a front elevation view of the handrail of FIG. 1. The opposing rear elevation view is a mirror image of the illustrated view.]
[FIG. 3 is a top plan view of the handrail of FIG. 1.]
[FIG. 4 is a bottom plan view of the handrail of FIG. 1.]
[FIG. 5 is a left side elevation view of the handrail of FIG. 1; and,]
[FIG. 6 is a right side elevation view of the handrail of FIG. 1.]

[In FIGS. 1-6, the] *The* broken lines [indicate environmental features and ] *in the drawings illustrate portions of the handrail that* form no part of the claimed design.

1 Claim, 2 Drawing Sheets

Matter enclosed in heavy brackets [ ] appears in the original patent but forms no part of this reissue; matter printed in italics indicates the additions made by reissue.

(58) Field of Classification Search
CPC ... E04F 11/18; E04F 11/1802; E04F 11/1808; E04F 11/1836; E01F 15/0453; B63B 17/04
See application file for complete search history.

(56) References Cited

U.S. PATENT DOCUMENTS 4,077,173 A * 3/1978 Rozanski ..... E04H 4/00 4/506
4,887,323 A * 12/1989 DiVito et al. ..... A47K 3/003 4/577.1
5,333,323 A * 8/1994 Aymes ..... E04H 4/144 182/93
5,384,927 A * 1/1995 Mardero ..... A61G 7/053 248/289.11
5,727,264 A * 3/1998 Craig et al. ..... E04H 4/0037 4/489
D409,311 S * 5/1999 Victor et al. ..... D25/41.1
D417,287 S * 11/1999 Victor ..... D25/41.1
6,185,875 B1 * 2/2001 Victor et al. ..... E04H 3/123 256/59
6,601,245 B2 * 8/2003 Weiss ..... E04H 4/144 182/106
6,854,216 B2 * 2/2005 Ahrens ..... E04H 3/123 52/183
D589,629 S * 3/2009 French ..... D25/41.1
D608,018 S * 1/2010 Stimpson et al. ..... D25/41.1
D706,448 S * 6/2014 Laitta ..... E04F 11/18 D25/41.1
D706,449 S * 6/2014 Laitta ..... D25/41.1
D706,450 S * 6/2014 Laitta ..... D25/41.1
D706,451 S * 6/2014 Laitta ..... D25/41.1
D706,452 S * 6/2014 Laitta ..... D25/41.1
D710,122 S * 8/2014 Skalka ..... D6/370
D710,624 S * 8/2014 Skalka ..... D6/370
D710,626 S * 8/2014 Skalka ..... D6/370
D711,174 S * 8/2014 Skalka ..... D6/717
D711,175 S * 8/2014 Skalka ..... D6/717
D711,176 S * 8/2014 Skalka ..... D6/717
D722,921 S * 2/2015 Skalka ..... D12/115
D725,792 S * 3/2015 Cullen ..... D25/38.1
D726,473 S * 4/2015 Skalka ..... D6/717
D726,474 S * 4/2015 Skalka ..... D6/717
D727,669 S * 4/2015 Skalka ..... D6/717
D735,091 S * 7/2015 Slaughenhoupt ..... D12/115
D756,531 S * 5/2016 Hagerty ..... D25/41.1
D783,858 S * 4/2017 Hixon ..... D25/41.1
2001/0006231 A1 * 7/2001 McCracken ..... 256/59

OTHER PUBLICATIONS

Pool Jewels, Rail Goods, pooljewels.com/railgoods.html, publicly available at least as of Jan. 17, 2013, last visited Aug. 7, 2013, 2 pages.

* cited by examiner

Canceled

Canceled

Canceled

Canceled

Canceled

Canceled

FIG. 11
New
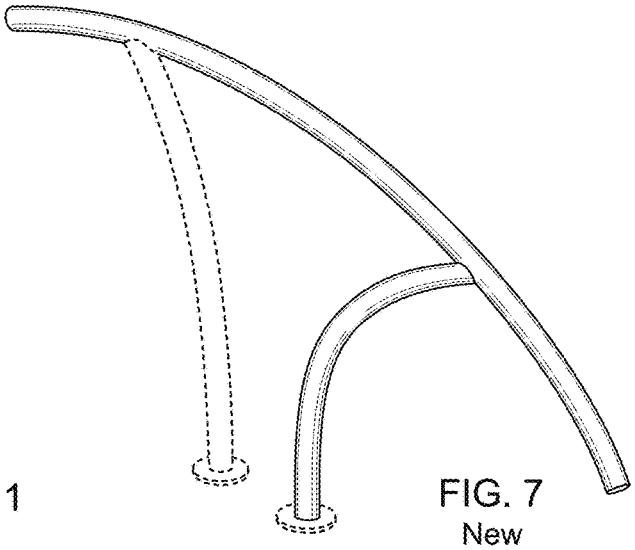
FIG. 7
New
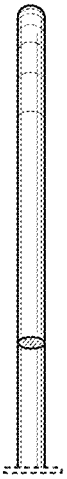
FIG. 12
New
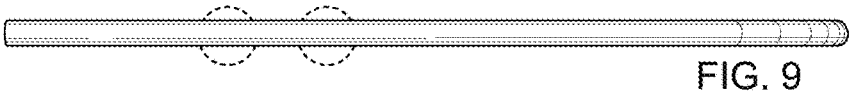
FIG. 9
New
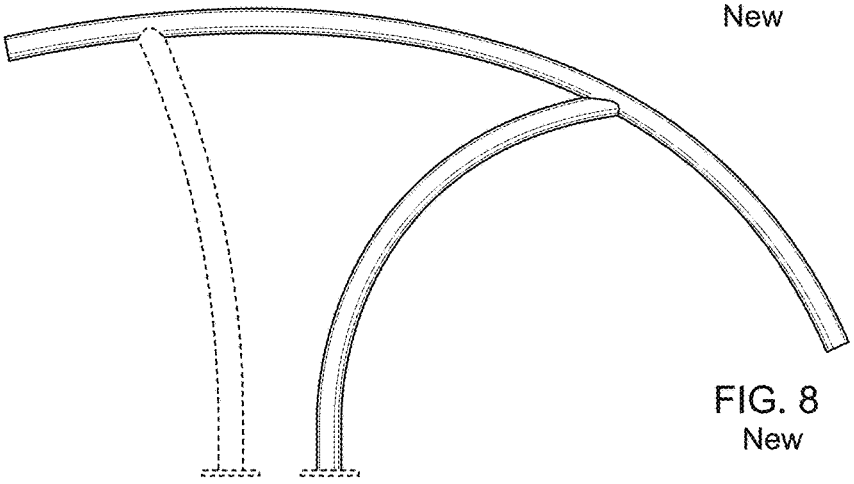
FIG. 8
New
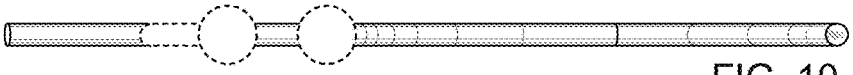
FIG. 10
New